United States Patent
Wolf et al.

(10) Patent No.: US 10,974,629 B2
(45) Date of Patent: Apr. 13, 2021

(54) VENTILATED SEAT AND METHOD FOR VENTILATING A SEAT

(71) Applicant: Ford Global Technologies, LLC, Dearborn, MI (US)

(72) Inventors: Philipp Wolf, Cologne (DE); Nikica Hennes, Aachen (DE); Jeroen Lem, Maastricht (NL)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 15/969,039

(22) Filed: May 2, 2018

(65) Prior Publication Data
US 2018/0361894 A1  Dec. 20, 2018

(30) Foreign Application Priority Data
Jun. 14, 2017 (DE) .......................... 102017210042.7

(51) Int. Cl.
*B60N 2/56* (2006.01)
*B60N 2/00* (2006.01)

(52) U.S. Cl.
CPC ........... *B60N 2/5657* (2013.01); *B60N 2/002* (2013.01)

(58) Field of Classification Search
CPC ........ B60N 2/002; B60N 2/56; B60N 2/5621; B60N 2/5607; B60N 2/5628; B60N 2/5635; B60N 2/5657
USPC ....... 297/180.1, 180.13, 180.14; 454/69–165
See application file for complete search history.

(56) References Cited

U.S. PATENT DOCUMENTS

| | | | |
|---|---|---|---|
| 6,491,577 B2 | 12/2002 | Yoshinori et al. | |
| 9,004,993 B2 * | 4/2015 | Fujii | B60H 1/00285 |
| | | | 454/120 |
| 2009/0229785 A1 | 9/2009 | Kadle et al. | |
| 2009/0284052 A1 | 11/2009 | Bajic et al. | |
| 2014/0246887 A1 * | 9/2014 | Clos | G01L 1/04 |
| | | | 297/217.3 |
| 2015/0217665 A1 * | 8/2015 | Hickey | B60N 2/5621 |
| | | | 297/180.1 |
| 2016/0272038 A1 * | 9/2016 | Tanaka | B60N 2/5657 |
| 2017/0101790 A1 * | 4/2017 | Cook | E04F 21/085 |

FOREIGN PATENT DOCUMENTS

| | | |
|---|---|---|
| DE | 102008025059 A1 | 12/2008 |
| DE | 102010063136 A1 | 6/2012 |
| DE | 102016216258 A1 | 3/2017 |

(Continued)

*Primary Examiner* — Vivek K Shirsat
*Assistant Examiner* — Ko-Wei Lin
(74) *Attorney, Agent, or Firm* — David Coppiellie; Price Heneveld LLP

(57) ABSTRACT

A ventilated seat having ventilation openings arranged on a seat surface of the seat, a ventilation device for generating an air flow, ventilation channels for air-conducting connection of the ventilation device to the ventilation openings, flow control devices for the individual opening and closure of the ventilation channels and/or of the ventilation openings, sensors for determining a force applied to the seat surface and/or a pressure acting on the seat surface and/or for determining an air pressure in the ventilation channels, and a control unit designed to control the flow control devices in accordance with the force determined and/or the pressure determined by the sensors.

13 Claims, 3 Drawing Sheets

(56) References Cited

FOREIGN PATENT DOCUMENTS

| | | |
|---|---|---|
| JP | 2006021572 A | 1/2006 |
| JP | 2006117085 A | 5/2006 |
| JP | 2013193688 A | 9/2013 |
| KR | 101634128 B1 | 7/2016 |
| WO | 2015033070 A1 | 3/2015 |

* cited by examiner

VENTILATED SEAT AND METHOD FOR VENTILATING A SEAT

FIELD OF THE INVENTION

The present disclosure generally relates to ventilated seats, and more particularly to a ventilated seat having controlled air flow control devices and to a method for ventilating a seat.

BACKGROUND OF THE INVENTION

Excessively high or excessively low temperatures and humidity can cause discomfort to a person sitting on a seat, particularly to a vehicle passenger sitting on a vehicle seat. To avoid such discomfort, the seat can have devices such as a seat ventilation system having ventilation openings on the seat surface facing the person using the seat and having fans.

Typically, with the use of a fan, an air flow is generated and air is passed to the seat surface and discharged therefrom to the environment. In other words, the person sitting on the seat is exposed to the air flow. This can be air conditioned air, e.g., air cooled or heated and/or dried, as required. Moreover, systems are known in which air, such as air conditioned air, is blown at the person sitting on the seat or air is sucked away from the person in order to generate an air flow.

Problems may arise in the seat ventilation system described if one or more ventilation openings are blocked. Such a blockage can be attributable, for example, to excessive pressure imposed by the sitting person, such as an at least partial closure of the ventilation openings by the body of the sitting person. The increased pressure results in an increased flow resistance for the corresponding ventilation opening. However, since the air flow preferentially takes the flow path with the least flow resistance through the ventilation openings under the least pressure, the humidity and temperature in the regions under a high pressure can then no longer be influenced by the air flow or only to a limited extent. Instead, the majority of the air flow is generally lost via ventilation openings which are not in contact with the person using the seat.

It is therefore desirable to influence the temperature and/or air humidity even in regions with at least partially blocked ventilation openings, especially in the regions in which a person using the seat is in direct contact with the seat surface.

SUMMARY OF THE INVENTION

According to an aspect of the present invention, a ventilated seat is provided. The ventilated seat includes ventilation openings arranged on a seat surface, a ventilation device generating an air flow, and ventilation channels for air-conducting connection of the ventilation device to the ventilation openings. The ventilated seat also includes flow control devices for individual opening and closure of the ventilation channels and/or of the ventilation openings, sensors determining at least one of a force applied to the seat surface, a pressure acting on the seat surface, and an air pressure in the ventilation channels, and a control unit controlling the flow control devices in accordance with the force determined and/or the pressure determined by the sensors.

According to another aspect of the present invention, a ventilated seat is provided. The ventilated seat includes ventilation openings arranged on a seat surface, a ventilation device generating an air flow, and ventilation channels connecting the ventilation device to the ventilation openings. The ventilated seat also includes flow control devices for controlling air flow through the ventilation openings, one or more sensors determining a load on the seat, and a control unit controlling the flow control devices in accordance with the load.

According to a further aspect of the present invention, a method for ventilating a seat is provided. The method includes the steps of generating an air flow, passing the air flow through ventilation channels of the seat and through ventilation openings arranged on a seat surface of the seat, determining at least one of a force applied to the seat surface, a pressure acting on the seat surface, and an air pressure in the ventilation channels, and associating the determined at least one force and pressure with associated ventilation channels and/or associated ventilation openings. The method also includes the steps of defining setpoint opening states of the ventilation channels and/or ventilation openings in accordance with the associated at least one force and pressure, determining the actual opening states of the ventilation channels and/or ventilation openings, comparing the actual opening states with the setpoint opening states, and opening or closing the ventilation channels and/or ventilation openings if there is a difference between the actual opening state and the setpoint opening state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the examples illustrated below, reference is made to the attached drawings, which show some of the examples and in which specific embodiments in which the invention can be carried out are shown for the purpose of illustration. Since components of embodiments can be positioned in a number of different orientations, the directional terminology is used for illustration and is in no way limiting.

It is self-evident that other embodiments can be used and structural or logical modifications made without deviating from the scope of protection of the present invention. It is self-evident that the features of the various illustrative embodiments described herein can be combined with one another, unless specifically stated otherwise. The following detailed description should not therefore be interpreted in a restrictive sense, and the scope of protection of the present invention is defined by the attached claims. In the figures, identical or similar elements are provided with identical reference signs, where this is expedient.

Figure 1:
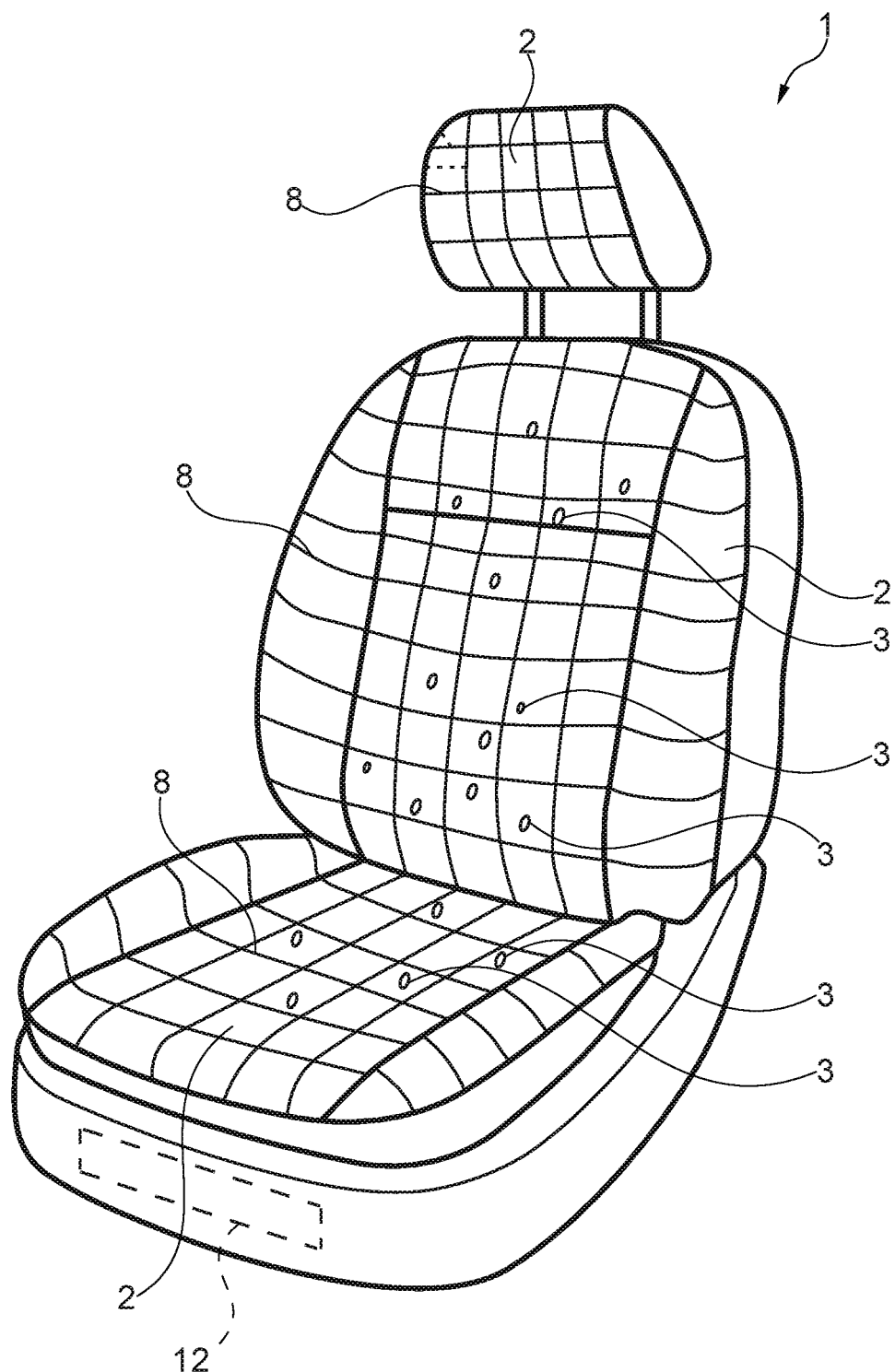
FIG. 1 is a front schematic illustration of a seat according to one embodiment, designed as a vehicle seat.

FIG. 1 shows a ventilated seat 1 designed as a vehicle seat, according to one embodiment. The seat 1 generally has a seat base connected to a seatback and a headrest connected to the top of the seatback. The seat 1 has a seat surface 2 and ventilation openings 3 arranged on the seat surface 2. The ventilation openings 3 are distributed non-uniformly on the seat surface 2 in the example shown but can also be arranged in some other ways.

Sensors 8 are furthermore arranged on the seat surface 2. In one embodiment, the sensors 8 are designed in the example as fiber optic pressure sensors distributed in the form of a matrix on the seat surface 2. The sensors 8 are used to determine a pressure acting on the seat surface 2, which can be exerted by a person 9 using the seat 1 (see FIG. 2), for example, and to determine a pressure distribution resulting therefrom. In this way, a particular pressure can be associated with each ventilation opening 3.

Figure 2:
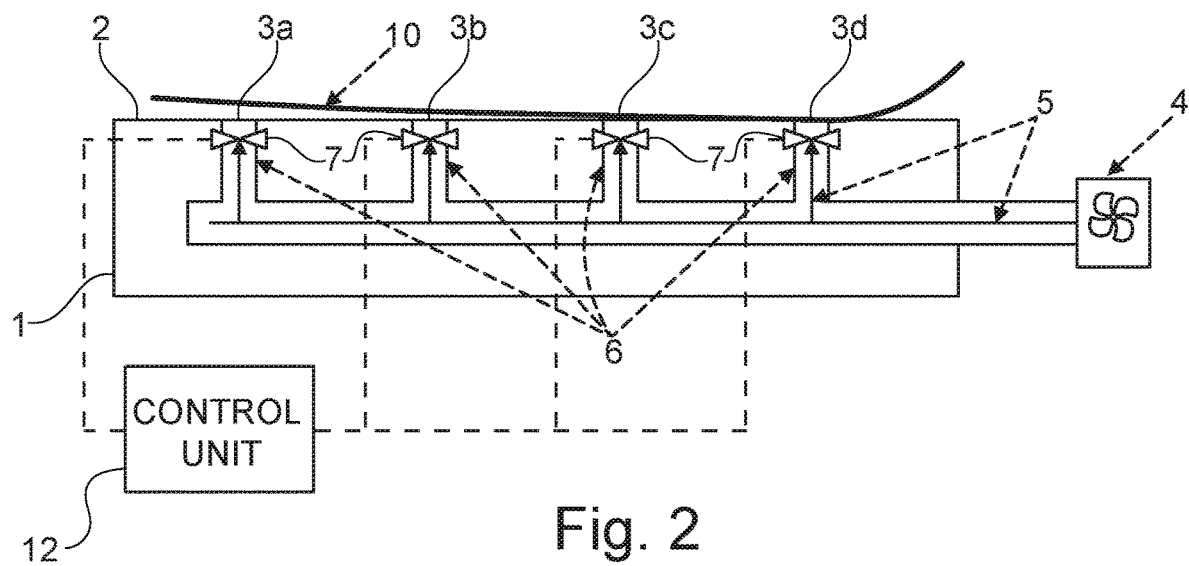
FIG. 2 is a schematic illustration of a cross section of the seat shown in FIG. 1 showing the open ventilation openings.
Figure 3:
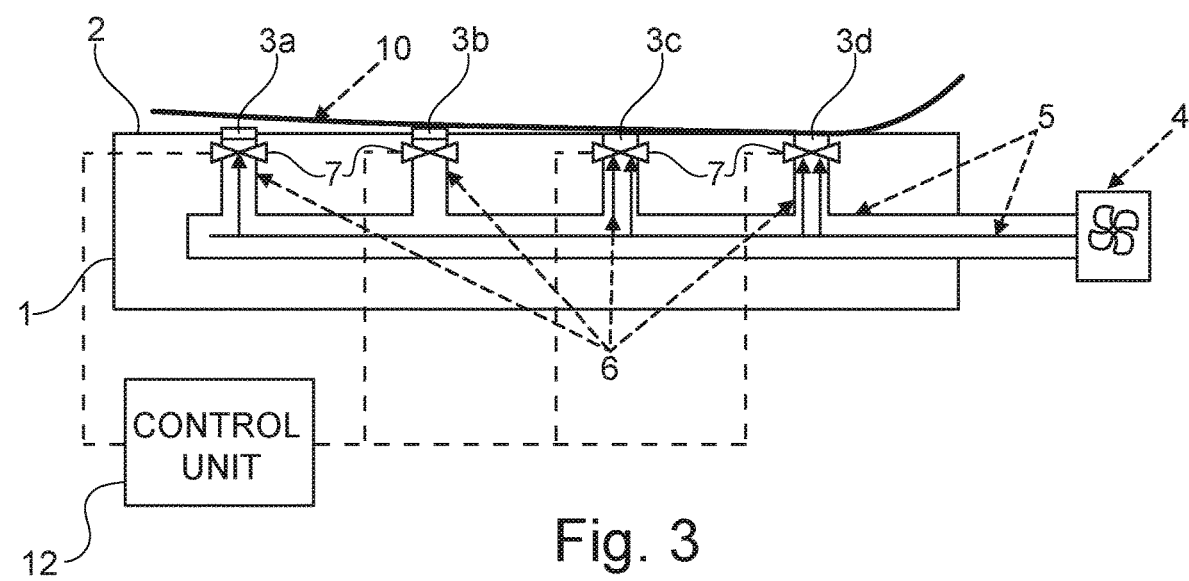
FIG. 3 is a schematic illustration of the cross section of the seat with partially closed ventilation openings.

The measured pressure values recorded by the sensors 8 are passed to a control unit 12 which is configured to control flow control devices 7 as illustrated in FIGS. 2 and 3 in accordance with the pressure determined by the sensors 8. The control unit 12 may include a microprocessor and/or other digital or analog control circuitry and may be a shared or dedicated controller which may be located on or near the seat.

FIGS. 2 and 3 show a schematic cross section through the seat 1 according to one embodiment. Here too, the ventilation openings 3a, 3b, 3c, 3d arranged on the seat surface 2 can be seen. The ventilation openings 3a, 3b, 3c, 3d are each connected by ventilation channels 6 to a ventilation device 4, which, in the example shown and described herein, is a fan. The ventilation device 4 is used to generate an air flow 5, which flows from the interior of the seat 2 in the direction of the seat surface 2.

Arranged in the ventilation channels 6 leading to the ventilation openings 3a, 3b, 3c, 3d are shutoff valves as flow control devices 7, which are used for the individual opening and closure of the ventilation channels 6. After the closure of the ventilation channel 6, it is also impossible for any more air to flow through the associated ventilation openings 3a, 3b, 3c and 3d, respectively.

The illustration in FIG. 2 shows the normal state, in which all the flow control devices 7 are open, with the result that the air flow 5 can theoretically flow through the ventilation openings 3a, 3b, 3c, 3d. As can also be seen, however, ventilation openings 3c and 3d are at least partially blocked by the person 10 using the seat 1 by sitting on top of the seat 1, and the air flow 5 through the ventilation openings 3c and 3d is therefore at least reduced in comparison with the air flow 5 through ventilation openings 3a and 3b.

This blockage is detected from a pressure increase in the region of the seat surface 2, which is associated with ventilation openings 3c and 3d. The flow control devices 7 in the ventilation channels 3a and 3b are then closed by use of the control unit 12, while the flow control devices 7 in ventilation channels 3c and 3d continue to remain open. This state is shown in FIG. 3. As a result, the air flow 5 in ventilation channels 3c and 3d is intensified, as the air pressure increases, and effective ventilation can be achieved even in the region of the at least partially blocked openings. After a certain period of time, the pressure acting on the seat surface 2 can be determined again and compared with a limit value. Depending on the result, the flow control devices 7 are then controlled again by the control unit 7 between the open and closed positions.

Figure 4:
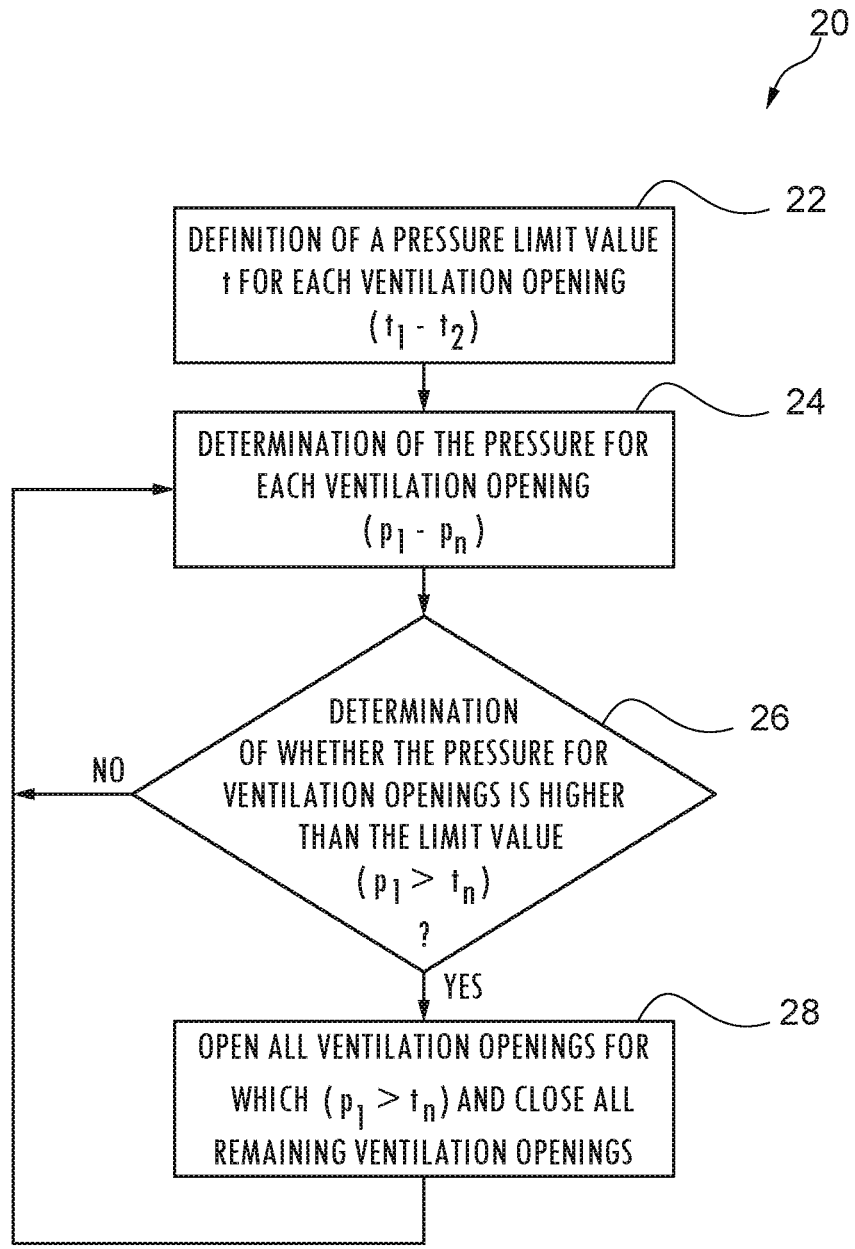
FIG. 4 is a flow diagram illustrating part of the method of ventilating a seat, according to one embodiment.

FIG. 4 shows a flow diagram of part of a method 20 of ventilating a seat, according to one embodiment, wherein an air flow 5 flows from the interior of the seat 2 in the direction of the ventilation openings 3. The features of generating an air flow 5 and passing the air flow 5 through ventilation channels 6 of the seat 1 and through ventilation openings 3 arranged on a seat surface 2 of the seat 1 have been omitted from the illustration.

In a first step 22 of method 20, a pressure limit value where i=1-n, is defined. Here, the pressure limit value $t_i$ is chosen so that it is possible to infer a blockage of the associated ventilation opening 3 from an overshoot or an undershoot.

In a second step 24, the pressure $p_i$, where i=1-n (actual pressure), is determined. Next, pressure $p_i$ is compared with the associated pressure limit value $t_i$ for each ventilation opening 3 at step 26. If the pressure $p_i$ exceeds the limit value the associated ventilation opening 3 is opened at step 28 if it is not already open. All the other ventilation openings 3, for which the pressure $p_i$ does not exceed the limit value are closed if they are not already closed. After this or if the limit value $t_i$ is not exceeded by any ventilation opening 3, the pressure $p_i$ can be determined again for each ventilation opening, wherein the steps of method 20 already described follow in corresponding fashion.

The ventilated seat and method of ventilating a seat is based on the basic concept of adapting the air flow with reference to pressure and/or force data resulting, for example, from the weight of the sitting person. In this case, air channels with a high pressure are (partially) opened by use of a control unit and all the others are (partially) closed. This ensures that the air flows primarily in the region in which a person is in direct contact with the seat surface. Three different variants can be obtained, for example: air channels/ventilation openings with a low pressure are closed (to the extent that these are not closed or are only partially closed) or air channels/ventilation openings with a high pressure are opened (to the extent that these are not open or are only partially open), or a combination of the two abovementioned variants is carried out.

In other words, completely or partially blocked ventilation channels and/or ventilation openings can be analyzed with reference to a force or pressure change, such as by determining the pressure acting on the ventilation openings or on the seat surface adjoining the ventilation openings. If the pressure determined reaches or exceeds a predefined limit value, a blockage of the ventilation opening can be assumed. The higher the pressure determined, the greater is the blockage. That is the greater the proportion of the ventilation opening which is blocked, up to complete blockage. Accordingly, less air can flow through the ventilation openings, down to complete disappearance of the air flow.

As an alternative, a change in the air pressure in the ventilation channel leading to the ventilation opening can also be determined. In this case too, a blockage of the corresponding ventilation opening can be assumed if a predefined limit value is reached or exceeded in the case of an air flow directed from the inside of the seat to the ventilation openings or a predefined limit value is undershot in the case of an air flow directed from the ventilation openings to the interior of the seat. If a blockage is detected, at least a partial or even complete closure of the remaining unblocked ventilation openings and/or of the ventilation channels leading to these unblocked ventilation openings is envisioned.

In the case of an air flow directed from the inside of the seat to the ventilation openings, this causes a higher air pressure in the ventilation channels leading to the blocked ventilation openings, with the result that air can flow out even in the region of the blocked ventilation openings and the temperature and the humidity can be influenced by this air flow. In the case of an air flow directed from the ventilation openings to the interior of the seat, a greater reduction in pressure in the ventilation channels and at the ventilation openings can be generated by closing the unblocked ventilation openings. This reduced pressure can produce an increased air flow, thus ensuring that the person sitting on the seat can feel a ventilation effect in this case too.

A ventilated seat such as a vehicle seat, according to one embodiment, has ventilation openings arranged on a seat surface of the seat. Here, the seat surface should be taken to mean the entire surface which faces a person using the seat. It can be, for example, the seat area of the seat base which comes into contact with the buttocks and thighs of the person and/or the surface of the seat backrest which faces the person, which comes into contact with the back and possibly with the head of the person such as via the headrest.

According to one embodiment, the seat has a plurality of ventilation openings. These openings can be of identical or different design with respect to the size and geometry thereof, and can be arranged in a uniformly or non-uniformly distributed manner on the seat surface. In regions in which particularly close contact between the seat surface and the person using the seat is probable, e.g., that region of the seat surface which corresponds to the lower back of the person, it is possible, for example, for a larger number of ventilation openings to be provided than in seat surface regions in which direct contact with the person using the seat is less likely.

The ventilated seat according to one embodiment furthermore has a ventilation device for generating an air flow. The ventilation device can be a fan or a blower, for example. The ventilation device can be designed to generate an air flow flowing from the interior of the seat in the direction of the ventilation openings, which generally is in the direction of the person using the seat, and/or an air flow flowing from the ventilation openings in the direction of the interior of the seat. It is also possible for a plurality of ventilation devices to be present, e.g., a first fan for the seat base cushion and a second fan for the backrest of the seat.

Furthermore, the seat according to one embodiment has ventilation channels for air-conducting connection of the ventilation device to the ventilation openings. A channel should be taken to mean a connection, continuous over the length of the channel, between the ventilation device and a ventilation opening. In other words, each ventilation channel begins at the ventilation device (start of the ventilation channel) and ends at one of the ventilation openings (end of the ventilation channel), wherein air can be fed in or discharged only at the start and end of the ventilation channel.

It is possible, for example, for a branching ventilation channel system to be provided, in which, after a common initial ventilation channel section, for example, a ventilation channel section arranged from the start of the ventilation channel in the direction of the end of the ventilation channel, a plurality of ventilation channel sections emanating from the ventilation channel section are formed, each of the plurality of ventilation channel sections, for its part, ending at a respective ventilation opening. It is also possible for multiple branches to be provided.

By way of example, the ventilation channels can be arranged in the interior of the seat so as not to be visible from the outside. For example, the ventilation channels can be arranged in the form of gaps in the seat upholstery, the seat shell or behind a suitable panel. However, the ventilation channels can also be designed as separate components, such as in the form of plastic hoses. There is also the possibility of arranging the ventilation channels in a ventilation or air-conditioning insert in the seat.

According to one embodiment, precisely one ventilation device, such as a single fan, is provided, which is connected in an air-conducting manner to all the ventilation openings. It is possible, for example, for the ventilation device to be arranged in a ventilation channel, which branches in such a way, downstream in the case of an air flow directed from the interior of the seat to ventilation openings or upstream in the case of an air flow directed from the ventilation openings to the interior of the seat, that each ventilation opening is assigned precisely one ventilation channel.

The seat according to one embodiment furthermore has flow control devices for the individual opening and closure of the ventilation channels and/or of the ventilation openings, wherein opening or closure can be partial or complete. Individual means that each ventilation opening can be closed or opened independently of the other ventilation openings. For this purpose, the flow control device can be arranged on or in the associated ventilation channel or on or in the associated ventilation opening. In one variant embodiment, flow control devices are designed as valves. For example, all the flow control devices can be designed as valves.

Moreover, the seat according to one embodiment, has sensors for determining a force applied to the seat surface and/or a pressure acting on the seat surface and/or for determining an air pressure in the ventilation channels. The sensors can be designed as force or pressure sensors, for example. The sensors can advantageously be associated with one or more ventilation openings, making it possible to determine for each ventilation opening a pressure or force value which can be used to assess the presence of a blockage of this ventilation opening.

The seat furthermore has a control unit, which is designed to control the valves in accordance with the force determined and/or the pressure determined by the sensors. If a predefined pressure or force limit value is exceeded or undershot, the ventilation openings and/or ventilation channels with which the pressure or force value determined is associated are opened or closed or sealed. Starting from an initial state in which all the channels are partially opened, e.g., 50% opened, for example, some of the channels are opened or closed to a greater extent if the value is exceeded or undershot.

In one embodiment, the control unit may include a processor, such as a microprocessor, which is designed to identify blocked ventilation openings on the basis of a pressure or force distribution on the seat surface or of a pressure distribution in the ventilation channels, the distribution being determined by the sensors, and to transmit a signal to the control unit to control the respective flow control devices for the individual opening and closure of this ventilation opening and/or of the ventilation channel.

The seat advantageously offers the possibility of detecting blocked ventilation openings by observing a pressure or force variation by use of sensors and, if there is a change in the pressure or force beyond a predetermined amount, this is used to identify the blocked ventilation openings. Owing to the relationship between force and pressure (force per unit area), it is possible, according to one embodiment, to use both force and pressure as measured variables for the identification of blocked ventilation openings. Irrespective of the direction of the air flow, a force applied to the seat surface, such as the weight of the person using the seat, or the pressure on the seat surface resulting from the weight can be used to determine the blocked ventilation openings.

Once the blocked ventilation openings have been determined or identified, the air pressure applied to these blocked ventilation openings can be increased by closing some or all of the unblocked openings by use of flow control devices. For this purpose, the flow control devices are controlled in an appropriate manner by use of the control unit. This provides the possibility of enabling effective control of the temperature and humidity, even in the seat regions with at least partially blocked ventilation openings, and of improving the sitting comfort for the person using the seat.

According to various variant embodiments, sensors can be designed as fiber optic pressure sensors. Sensors of this kind can comprise glass fibers as pickups, for example. The occurrence of a pressure load induces bending losses, which lead to transmission changes in the glass fiber. The pressure can then be inferred from these changes. There is the possibility of arranging a plurality of fiber optic pressure sensors in the form of a matrix distributed over the seat surface. Here, the specific number of fibers and the number of measurement points along a fiber can be chosen depending on the specific use. By using a close-meshed arrangement of the fibers of the fiber optic pressure sensor or sensors, it is possible to determine a pressure distribution on the seat surface.

According to further variant embodiments, sensors can be designed as capacitive and/or piezoresistive sensors. Piezoresistive pressure sensors can be produced at low cost and have a high sensitivity. According to further variant embodiments, sensors can be designed as force sensors. By use of force sensors, the force acting on the sensor can be determined. It is possible, for example, to determine a force acting on the seat surface, such as the weight of a person using the seat.

According to further variant embodiments, the seat can have a conditioning device for air conditioning. For example, the conditioning device can be used to heat or cool and/or dry the air in the air flow. For this purpose, the conditioning device can be arranged in the ventilation channel downstream of the ventilation device for generating the air flow in the case of an air flow directed from the interior of the seat in the direction of the ventilation openings.

As an alternative, the conditioning device can also be arranged ahead of, i.e., upstream of, the ventilation device for generating the air flow, with the result that the already air conditioned air reaches the ventilation device and is directed into the ventilation channel.

By use of the conditioning device, the air for ventilating the seat can be adapted in respect of temperature and/or air humidity to the respective ambient conditions and the wishes of the person using the seat, contributing to improve comfort of the person using the seat.

A vehicle according to one embodiment has a seat in accordance with the above description. Here, a vehicle should be taken to mean any mobile means of transport including either a land vehicle or a watercraft or aircraft, such as a passenger car. In particular, the vehicle seat of a vehicle can be designed in accordance with the above description. The ventilation of the seat contributes to improved driving comfort and can also lead to increased safety since the temperature of the seat can be better regulated and temperature stress on the driver can be largely avoided.

A method for ventilating a seat has the features explained in greater detail below, which can be carried out in the sequence of the explanation but can also be carried out in a different sequence, depending on requirements. The method can be carried out by use of the ventilated seat explained above, for example. To this extent, the above statements made to explain the ventilated seat according to one embodiment also serve to describe the method. According to the method according to one embodiment, an air flow is generated. This air flow can flow either from the interior of the seat in the direction of the seat surface or from the seat surface in the direction of the interior of the seat. Irrespective of the direction of flow, the air flow is passed through ventilation channels of the seat and ventilation openings arranged on the seat surface. In other words, the air flow flows through the ventilation channels and at the ventilation openings. Furthermore, a force applied to the seat surface of the seat and/or a pressure acting on the seat surface of the seat and/or an air pressure in the ventilation channels are determined as measured load variables. The measured variables may indicate a load on the seat.

The measured load variables determined, force and/or pressure, wherein pressure also includes the air pressure, are associated with one or more ventilation channels and/or ventilation openings, which are referred to below as associated ventilation channels or associated ventilation openings. For example, a force or pressure distribution on the seat surface can be determined by use of the sensors described above. Setpoint opening states, e.g., open, closed, partially closed etc., of ventilation channels and/or ventilation openings are then defined in accordance with the associated force and/or the associated pressure. In other words, an ideal state in respect of the opening state is determined for one, some or all ventilation channels and/or ventilation openings, in particular for the associated ventilation channels and/or ventilation openings, the opening state being dependent on the force determined and/or on the pressure determined.

For example, the setpoint opening states can be defined in such a way that blocked ventilation channels and/or ventilation openings are supplied with a higher air pressure of the air flow. For this purpose, "open" can be defined as the setpoint opening state for the blocked ventilation channels and/or ventilation openings, while the "closed" setpoint opening state is defined for all the unblocked ventilation channels and/or ventilation openings. This configuration has the effect that the air flow flows more through the blocked ventilation channels and/or ventilation openings, with the result that effective control of the temperature and humidity is possible even in the seat regions, for example, and the sitting comfort for the person using the seat can be improved.

After the determination of the actual opening states of ventilation channels and/or ventilation openings, the actual opening states are compared with the setpoint opening states. If a difference between the actual opening state and the setpoint opening state for one, some or all ventilation channels and/or ventilation openings is detected, these ventilation channels and/or ventilation openings are opened or closed partially or completely in corresponding fashion, with the result that the setpoint opening state then corresponds to the actual opening state. A force applied to the seat surface of the seat and/or a pressure acting on the seat surface of the seat and/or an air pressure in the ventilation channels can then be determined again, and the subsequent steps are carried out in accordance with the above description.

According to various variant embodiments, setpoint opening states are defined in accordance with the associated force and/or the associated pressure by specifying a limit value for the force and/or the pressure and comparing the associated force and/or the associated pressure with the corresponding limit value. If the limit value is exceeded, a blockage of the associated ventilation channel and/or the associated ventilation opening can be inferred. The limit value can be the same or different for all the ventilation channels or ventilation openings. For example, different limit values can be specified, depending on the position of the ventilation opening on the seat surface.

"Open" is defined as the setpoint opening state of the associated, possibly blocked ventilation channels and/or ventilation openings if the limit value is exceeded. For all the other unassociated, ventilation channels and/or ventilation openings, on the other hand, "closed" is defined as the setpoint opening state. As already described, this makes it possible to focus the air flow on the blocked ventilation channels and/or ventilation openings.

If, in one variant embodiment, an air flow flowing from the seat surface in the direction of the interior of the seat is generated and the air pressure in the ventilation channels is determined as the measured variable, a reduced air pressure in this case indicates a blockage of the associated ventilation channels and/or ventilation opening. Here, there is the possibility, when the limit value is undershot, to define "open" as the setpoint opening state of the associated ventilation channels and/or of the associated ventilation openings and to define "closed" as the setpoint opening state of the remaining ventilation channels and/or ventilation openings in order to focus the air flow on the blocked ventilation channels and/or ventilation openings in this case too.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A ventilated seat comprising:
   ventilation openings arranged on a seat surface;
   a ventilation device generating an air flow;
   ventilation channels for air-conducting connection of the ventilation device to the ventilation openings;
   flow control devices for individual opening and closure of the ventilation channels and/or of the ventilation openings;
   sensors determining at least one of a force applied to the seat surface, a pressure acting on the seat surface, and an air pressure in the ventilation channels; and
   a control unit controlling the flow control devices in accordance with the force determined and/or the pressure determined by the sensors, wherein the control unit opens ventilation channels and/or ventilation openings having the force and/or the pressure greater than a limit value while closing ventilation channels and/or ventilation openings having the force and/or the pressure less than the limit value.

2. The ventilated seat as claimed in claim 1, wherein the sensors comprise pressure sensors.

3. The ventilated seat as claimed in claim 1, wherein the sensors comprise force sensors.

4. The ventilated seat as claimed in claim 1, wherein the flow control devices comprise valves.

5. The ventilated seat as claimed in claim 1, wherein the seat is a vehicle seat.

6. A ventilated seat comprising:
   ventilation openings arranged on a seat surface;
   a ventilation device generating an air flow;
   ventilation channels connecting the ventilation device to the ventilation openings;
   flow control devices for controlling air flow through the ventilation openings;
   one or more sensors determining a load on the seat; and
   a control unit controlling the flow control devices in accordance with the load, wherein the control unit determines a pressure and/or force based on the load for each of the ventilation openings and determines if the determined pressure and/or force for each of the ventilation openings is greater than a limit value, and further opens ventilation openings having the determined pressure and/or determined force greater than the limit value while closing ventilation openings having the determined pressure and/or determined force less than the limit value.

7. The ventilated seat as claimed in claim 6, wherein the load comprises force or pressure applied to the seat.

8. The ventilated seat as claimed in claim 7, wherein the one or more sensors comprise pressure sensors sensing pressure acting on the seat.

9. The ventilated seat as claimed in claim 7, wherein the one or more sensors comprise force sensors sensing the force applied to the seat.

10. The ventilated seat as claimed in claim 6, wherein the load comprises air pressure in the ventilation channels.

11. The ventilated seat as claimed in claim 10, wherein the one or more sensors comprise air pressure sensors sensing the air pressure in the ventilation channels.

12. The ventilated seat as claimed in claim 6, wherein the flow control devices comprise valves.

13. The ventilated seat as claimed in claim 6, wherein the seat is a vehicle seat.

* * * * *